Figure 3:
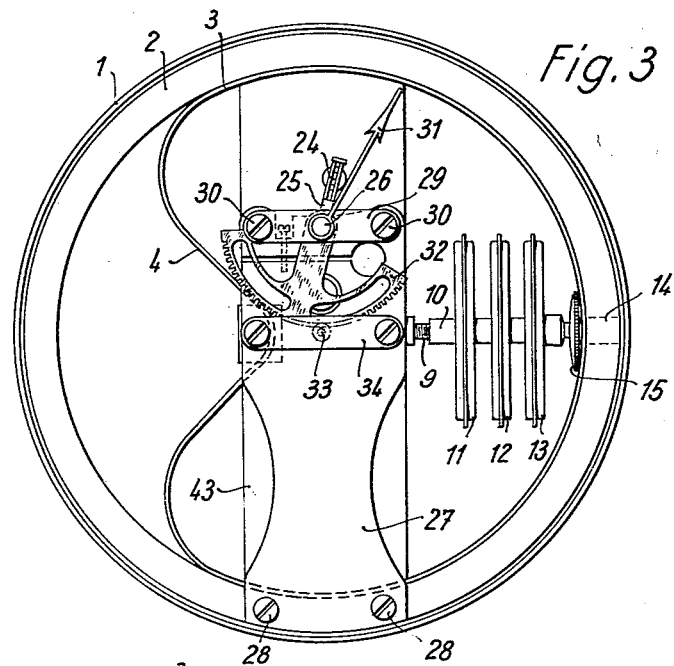

March 5, 1963 K. B. WALZ ETAL 3,079,799
MEASURING INSTRUMENT, PARTICULARLY BAROMETER OR THE LIKE
Filed June 17, 1958 2 Sheets-Sheet 1
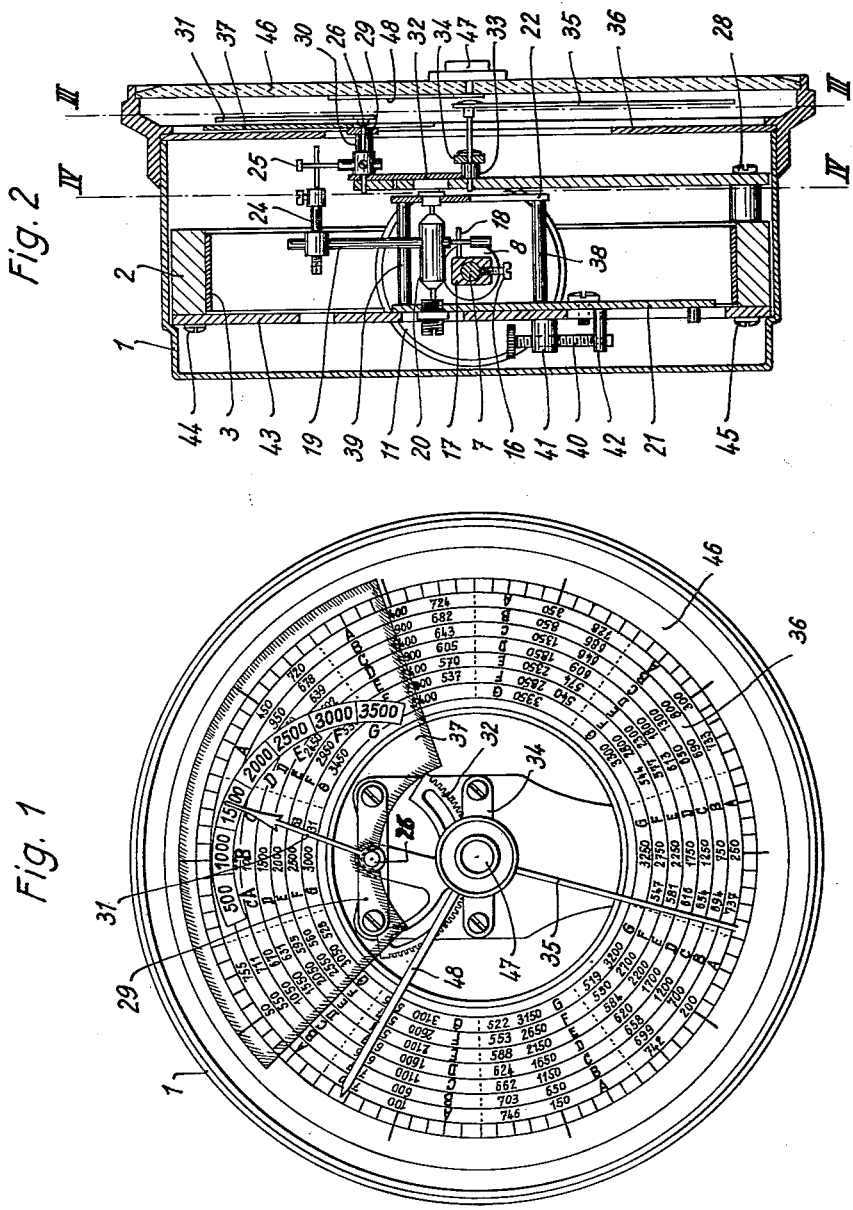
Inventors
Karl Bernhard Walz
and Wilhelm Huger
by Michael S. Striker
Attorney March 5, 1963  K. B. WALZ ETAL  3,079,799
MEASURING INSTRUMENT, PARTICULARLY BAROMETER OR THE LIKE
Filed June 17, 1958  2 Sheets-Sheet 2

Inventors
Karl Bernhard Walz
and Wilhelm Krüger
by Michael S. Striker
Attorney

United States Patent Office 3,079,799
Patented Mar. 5, 1963

3,079,799
MEASURING INSTRUMENT, PARTICULARLY
BAROMETER OR THE LIKE
Karl Bernhard Walz, Lerchenrain 2, Rammersweier, near Offenburg, Germany, and Wilhelm Huger, Riethelmerstrasse 55, Villingen, Germany
Filed June 17, 1958, Ser. No. 742,566
Claims priority, application Germany June 18, 1957
5 Claims. (Cl. 73—386)

The present invention relates to a measuring instrument, particularly for measuring atmospheric pressure or to a barometer operating as an altimeter of the type in which the measuring element produces the desired indication by the cooperation with a spring.

It is an object of the present invention to provide a material improvement of a measuring instrument of the above-mentioned type. The spring which provides the biasing force for the measuring element, is designed to affect the result of the measurement as little as possible.

According to the present invention this may be attained by providing a spring, the biasing force of which decreases when the spring becomes increasingly deformed when the tension exerted thereon by the pressure responsive measuring element increases, and vice versa.

In the preferred embodiment of the invention a spring in the form of an endless leaf spring is supported within a ring holding it at the outside, and has a circumference larger than the inner circumference of the holding ring so that, when inserted into the holding ring, the spring will form a bulge which is directed toward the center of the ring. The tension of the spring will then act upon the measuring instrument which is connected to the center of this bulge, and in the direction thereof, either directly or indirectly through a connecting member, and the shifting movement occurring at the point of connection between these parts will then be utilized for indicating the result of the measurement.

It has been found that a spring which is designed and mounted as above described will become the more flexible the more it will be deformed, and that, on the other hand, its tension will again accordingly increase as its degree of deformation will be reduced. Such operation of the spring acting upon the measuring element is of particular advantage in connection with aneroids which are conventionally used in barometers and the like since at an increasing atmospheric pressure the spring opposes the compression of such aneroids with a correspondingly decreasing force resulting in an increase in the sensitivity of the instrument and in the accuracy of the measurement attained thereby. Consequently, the atmospheric pressure to be measured will act substantially completely upon the aneroids so as to deform the same and the value of this pressure will not be reduced to any material extent by the deformation of the spring.

The design and manner of mounting the spring according to the invention is by no means limited to its application to barometers, but it may also be used to equal advantage for other measuring instruments, for example, in clocks and watches for attaining a uniform running thereof.

Further objects, features, and advantages of the present invention will become apparent from the following detailed description thereof, particularly when read with reference to the accompanying drawings, in which—

Figure 4:
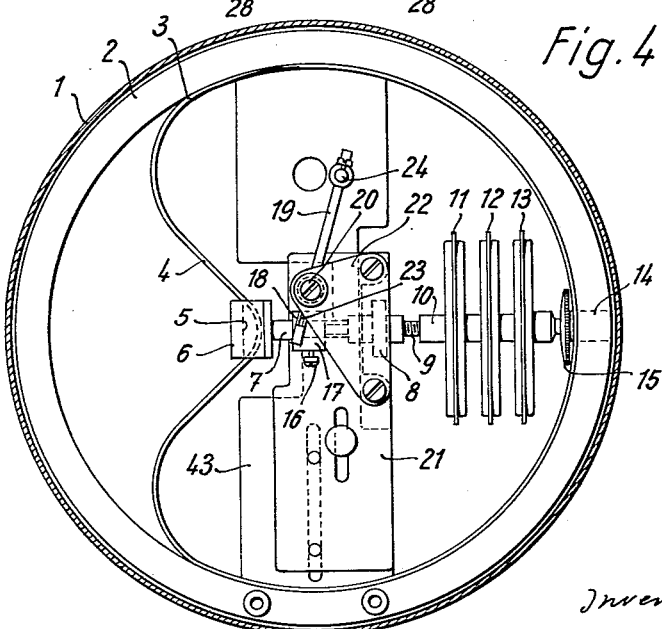

FIGURE 1 shows a plan view of an altimeter according to the invention;
FIGURE 2 shows a central vertical section of FIGURE 1;
FIGURE 3 shows a horizontal section taken along line III—III of FIGURE 2; while
FIGURE 4 shows a similar section taken along line IV—IV of FIGURE 2.

The altimeter as illustrated in the drawings comprises a housing 1 in which a solid ring 2 is fully enclosed and firmly secured. Tightly fitted into ring 2 is a continuous leaf spring 3 which has a circumference slightly larger than the inner circumference of ring 2 so that it will form a bulge 4 pointing toward the center of the ring. At the center of this bulge 4, spring 3 is held by a bracket 6 by passing through a recess 5 thereof, as illustrated particularly in FIGURE 4. This bracket 6 has on its other end a threaded shaft 7 upon which one end of a nut 8 is screwed, the other end of which is screwed upon a threaded pin 9 secured to a socket 10 on an aneroid 11 which is centrally connected to two further aneroids 12 and 13. The aneroids 11 to 13 thus are connected in series behind each other and are mounted at the other end on ring 2 by means of a threaded pin 14. An adjusting nut 15, as well as nut 8 with oppositely directed screw threads permit a proper adjustment of aneroids 11 to 13 and spring 3 so that the latter will exert a certain tension upon the eneroids which tends to draw the latter apart against the action of the atmospheric pressure acting thereon.

The more the atmospheric pressure increases, the more the aneroids 11, 12, and 13 will be compressed, while at a decrease in pressure, they will expand outwardly. This will result in shaft 7 being shifted in one direction or the other. This shifting movement is used for attaining an indication of the atmospheric pressure acting upon the aneroids. For this purpose, shaft 7 is provided with a slide member 17 which is adjustable thereon by means of a setscrew 16. Slide member 17 carries a pin 18 which forms the connection to the pointer mechanism of the instrument. This mechanism includes of a two-armed lever 19, the pivotal axis of which is formed by a shaft 20 which is rotatably mounted between two bearing plates 21 and 22. Pin 18 engages into a slot 23 in the shorter of the two arms of lever 19 and thereby transmits the adjusting movements thereof at an increased transmission ratio to the longer arm of lever 19. This longer arm likewise carries a pin 24 which engages into a slot in the shorter arm of a further two-armed lever 25 which is pivotable about the axis of a shaft 26 mounted in a bearing plate 29 which is held at the proper distance from plate 27 by spacing bars 30. Shaft 26 extends through bearing plate 29 and carries on its outer end a pointer 31.

The second, longer arm of the two-armed lever 25 has on its free end an arcuate rack 32 with gear teeth along its outer edge which are in mesh with a pinion 33, the shaft of which is likewise rotatably mounted at its lower end within bearing plate 27, and in a bearing plate 34, carrying on its other end a pointer 35 which is thus driven by pinion 33. The adjusting movement of pin 18 is therefore transmitted at an increased ratio to pointer 31 and also at a still greater transmission ratio to pointer or indicating member 35.

Pointer 35 forms the main pointer of the measuring instrument, and runs over a d'al 36. In accordance with its transmission ratio, pointer 35 may, in the case of the particular instrument shown in the drawings, carry out seven entire revolutions over the dial 36. These revolutions may, for example, together correspond to a difference in altitude from zero to 3500 m. with each revolution of pointer 35 indicating a difference of 500 m. The individual measuring ranges are marked on dial 36 by circular bands A to G. The measuring range of the instrument may, however be either considerably increased or reduced by providing different transmission ratios and by modifying the design of the aneroid or aneroids.

In order to indicate clearly on which of the circular dial bands A to G the measured value will be found, the auxiliary range pointer 31 has been provided which turns at such a reduced ratio relative to pointer 35 that it will indicate on its own dial 37 on which of the circular dial bands A to G the correct altitude should be read. Dial 37 of range pointer 31 is preferably made of transparent material and disposed in such a position as to cross several of the circular concentric scales of the main dial, and to extend at an angle thereto so that any confusion between the two pointers by the person reading the same will be prevented.

In order to attain an accurate adjustment of the proper transmission ratio of the pointer mechanism, bearing plates 21 and 22 which are connected by spacing bars 38 and 39 are together slidable and adapted to be adjusted by a setscrew 40. This setscrew 40 is mounted in a socket 41 on a stationary plate 43 which slidably supports the bearing plate 21 and is secured by screws 44 and 45 on ring 2. The front end of this setscrew is rotatable in a pin 42 which is mounted on bearing plate 21 so that, when setscrew 40 is adjusted, plate 21 will be shifted, whereby pin 18 will be accordingly shifted within slot 23 in the shorter arm of lever 19, and pin 24 will be likewise shifted within the slot in lever 25.

The measuring instrument itself is covered by a transparent plate 46 which carries at its center a knob 47 by means of which a setting pointer 48 may be adjusted in accordance with pointer 35 to indicate the change in altitude between one reading and another.

The main dial 36 not only indicates in its different ranges A to G the altitudes from zero to 3500 m., but also the values from 760 to 519 mm. of mercury column corresponding to the respective altitude. For the purpose of using the instrument as a barometer, it is thus no longer necessary to adjust it to the respective altitude where it is to be used.

Although our invention has been illustrated and described with reference to the preferred embodiments thereof, we wish to have it understood that it is in no way limited to the details of such embodiments, but is capable of numerous modifications within the scope of the appended claims.

Having thus fully disclosed our invention, what we claim is:

1. In a measuring instrument, in combination, a stationary support; spring means supported on said support and having a movable portion located opposite and spaced from a part of said support, said spring means being constructed and arranged in such a manner as to resiliently resist movement of said movable portion toward said part of said support with a spring force gradually decreasing as said movable portion of said spring means moves toward said part of said support; connecting link means connected at one end portion to said part of said support and at the other end portion to said movable portion of said spring means, said link means including pressure responsive means responsive to increased atmospheric pressure to reduce the length of said link means resulting in a decrease of the spring force acting on said pressure responsive means as said pressure means responds to an increase of the atmospheric pressure; a movable indicating member; and transmission means connecting said indicating member to said other end portion of said link means in such a manner that said indicating member is driven by said other end portion to indicate data related to the atmospheric pressure as said other end portion moves towards and away from said part of said support.

2. In a measuring instrument, in combination, a stationary support; an annular spring having an arcuate convex main portion carried by said support and an inwardly projecting bulge portion; connecting link means including pressure responsive means responsive to increased atmospheric pressure to reduce the length of said link means, said connecting link means being connected at one end portion to a part of said stationary support and at the other end portion to the innermost portion of said bulge portion in such a manner as to move said inwardly projecting bulge portion further inwardly upon reduction of the length of said link means whereby the length of said bulge portion is increased and the length of said main portion of said spring is reduced resulting in a decrease of the spring force acting on said pressure responsive means as said pressure responsive means responds to an increase of the atmospheric pressure; a movable indicating member; and transmission means connecting said indicating member to said other end portion of said link means in such a manner that said indicating member is driven by said other end portion to indicate data related to the atmospheric pressure as said other end portion moves toward and away from said part of said support.

3. In a measuring instrument, in combination, a stationary annular support; an annular spring having a greater peripheral length than said annular support and including an arcuate convex main portion carried by and resiliently abutting the inner annular surface of said annular support, and an inwardly projecting bulge portion; connecting link means connected at one end portion to a part of said stationary support and at the other end portion to the innermost portion of said bulge portion, said part being located diametrically opposite said innermost bulge portion, said link means including pressure responsive means responsive to increased atmospheric pressure to reduce the length of said link means whereby the length of said bulge portion is increased and the length of said main portion of said spring is reduced resulting in a decrease of the spring force acting on said pressure responsive means as said pressure responsive means responds to an increase of the atmospheric pressure; a movable indicating member; and transmission means connecting said indicating member to said other end portion of said link means in such a manner that said indicating member is driven by said other end portion to indicate data related to the atmospheric pressure as said other end portion moves toward and away from said part of said support.

4. In a measuring instrument, in combination, a stationary support; spring means supported on said support and having a movable portion located opposite and spaced form a part of said support, said spring means resiliently resisting movement of said movable portion toward said part of said support; connecting link means connected at one end portion to said part of said support and at the other end portion to said movable portion of said spring means, said link means including pressure responsive means responsive to increased atmospheric pressure to reduce the length of said link means; a first pointer means turnable about a first axis; first transmission means connecting said other end portion of said link means with said first pointer means so that said first pointer means is driven by said other end portion and performs a plurality of revolutions as the length of said link means varies; a multiple dial concentric with said axis and having a plurality of concentric circular scales respectively associated with successive revolutions of said first pointer means; second pointer means turnable about a second axis parallel to said first axis between a plurality of angularly spaced positions and having an indicating portion movable along a path crossing at least some of said concentric scales of said dial; second transmission means connecting said first transmission means with said second pointer means for turning said second pointer means successively between said positions as said first pointer means performs successive revolutions; and a plurality of indicia means respectively correlated with said concentric scales and located along said path, said indicia means indicating in said positions of said second pointer means the concentric scale with which said first pointer means cooperates.

5. An instrument as set forth in claim 4 and including a transparent dial member extending over to said concentric scales on said multiple dial and having said indicia means thereon, said indicia means indicating the ranges of said concentric scales.

References Cited in the file of this patent

UNITED STATES PATENTS

| | | |
|---|---|---|
| 342,406 | Walker | May 25, 1886 |
| 1,206,094 | Collinson | Nov. 28, 1916 |
| 1,510,852 | Hart | Oct. 7, 1924 |
| 2,323,166 | Urfer | June 29, 1943 |

FOREIGN PATENTS

| | | |
|---|---|---|
| 887,275 | Germany | Aug. 20, 1953 |